US010301917B2

(12) United States Patent
Nguyen et al.

(10) Patent No.: US 10,301,917 B2
(45) Date of Patent: *May 28, 2019

(54) MICROBUBBLES FOR TREATMENT CHEMICAL DELIVERY IN SUBTERRANEAN FORMATIONS

(71) Applicant: Halliburton Energy Services, Inc., Houston, TX (US)

(72) Inventors: Philip D. Nguyen, Houston, TX (US); Lee J. Hall, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/576,054

(22) PCT Filed: Jul. 24, 2015

(86) PCT No.: PCT/US2015/042066
§ 371 (c)(1),
(2) Date: Nov. 21, 2017

(87) PCT Pub. No.: WO2017/018998
PCT Pub. Date: Feb. 2, 2017

(65) Prior Publication Data
US 2018/0156019 A1 Jun. 7, 2018

(51) Int. Cl.
*E21B 43/267* (2006.01)
*C09K 8/70* (2006.01)
(Continued)

(52) U.S. Cl.
CPC ............... *E21B 43/25* (2013.01); *C09K 8/66* (2013.01); *C09K 8/70* (2013.01); *C09K 8/72* (2013.01);
(Continued)

(58) Field of Classification Search
CPC ............ C09K 2208/00; C09K 2208/10; C09K 8/516; C09K 8/70; E21B 33/00;
(Continued)

(56) References Cited

U.S. PATENT DOCUMENTS 4,359,391 A 11/1982 Salathiel et al.
6,207,620 B1 3/2001 Gonzalez et al.
(Continued)

FOREIGN PATENT DOCUMENTS

EP 2527586 A1 11/2012
WO 2012/171857 A1 12/2012
(Continued)

OTHER PUBLICATIONS

International Preliminary Report on Patentability issued in related PCT Application No. PCT/US2015/042066 dated Feb. 8, 2018, 9 pages.

(Continued)

*Primary Examiner* — Zakiya W Bates
(74) *Attorney, Agent, or Firm* — Thomas Rooney; Baker Botts L.L.P.

(57) ABSTRACT

Compositions, systems, and methods for delivering treatment chemicals, for example, to enhance conductivity in microfractures and/or low-permeability formations, are provided. In one embodiment, the methods comprise: providing a treatment fluid that comprises a base fluid and a plurality of microbubbles, wherein one or more of the microbubbles each comprise at least an outer shell and a treatment chemical within the shell, and have a diameter of about 100 microns or less; and introducing the treatment fluid into at least a portion of a subterranean formation. In some embodiments, the microbubbles may enter one or more microfractures in the subterranean formation and release the treatment chemical therein.

14 Claims, 3 Drawing Sheets

(51) Int. Cl.

| | | |
|---|---|---|
| *E21B 43/25* | (2006.01) | |
| *E21B 43/26* | (2006.01) | |
| *C09K 8/72* | (2006.01) | |
| *C09K 8/92* | (2006.01) | |
| *C09K 8/66* | (2006.01) | |
| *C09K 8/74* | (2006.01) | |
| *C09K 8/80* | (2006.01) | |
| *E21B 21/00* | (2006.01) | |
| *E21B 37/06* | (2006.01) | |
| *E21B 41/02* | (2006.01) | |

(52) U.S. Cl.
CPC ............ *C09K 8/74* (2013.01); *C09K 8/80* (2013.01); *C09K 8/92* (2013.01); *E21B 43/26* (2013.01); *E21B 43/267* (2013.01); *E21B 21/003* (2013.01); *E21B 37/06* (2013.01); *E21B 41/02* (2013.01)

(58) Field of Classification Search
CPC ...... E21B 43/267; E21B 33/138; E21B 37/00; E21B 43/26
See application file for complete search history.

(56) References Cited

U.S. PATENT DOCUMENTS

| | | | |
|---|---|---|---|
| 6,326,335 B1 | 12/2001 | Kowalski et al. | |
| 6,992,048 B2 | 1/2006 | Reddy et al. | |
| 8,551,926 B2 | 10/2013 | Huang et al. | |
| 8,689,871 B2* | 4/2014 | Khatri .................... | C04B 28/02 166/293 |
| 9,328,285 B2* | 5/2016 | Ekstrand ............... | E21B 43/267 |
| 2002/0106501 A1 | 8/2002 | Debe | |
| 2005/0126781 A1 | 6/2005 | Reddy et al. | |
| 2006/0198704 A1* | 9/2006 | Kerfoot .................... | B09C 1/00 405/128.5 |
| 2006/0281835 A1 | 12/2006 | Ong | |
| 2009/0025933 A1 | 1/2009 | Garcia-Lopez de Victoria et al. | |
| 2011/0120712 A1 | 5/2011 | Todd et al. | |
| 2012/0055593 A1 | 3/2012 | Kobayashi | |
| 2012/0097392 A1 | 4/2012 | Reyes et al. | |
| 2012/0207843 A1 | 8/2012 | Lebon et al. | |
| 2012/0227967 A1 | 9/2012 | Shaikh et al. | |
| 2013/0029883 A1 | 1/2013 | Dismuke et al. | |
| 2013/0068469 A1 | 3/2013 | Lin et al. | |
| 2013/0126175 A1* | 5/2013 | Al-Mulhem ............. | C09K 8/62 166/308.1 |
| 2013/0284437 A1 | 10/2013 | Nguyen et al. | |
| 2014/0034309 A1 | 2/2014 | Saini et al. | |
| 2014/0131042 A1 | 5/2014 | Nguyen et al. | |
| 2014/0144639 A1* | 5/2014 | Nguyen .................. | C09K 8/57 166/300 |
| 2014/0284049 A1* | 9/2014 | DiFoggio .............. | E21B 43/267 166/250.1 |
| 2014/0345878 A1* | 11/2014 | Murphree ............. | C09K 8/703 166/377 |
| 2015/0239759 A1* | 8/2015 | Kang ....................... | C02F 1/72 210/748.17 |

FOREIGN PATENT DOCUMENTS

| | | |
|---|---|---|
| WO | 2012/171858 A1 | 12/2012 |
| WO | 2015/102628 A1 | 7/2015 |

OTHER PUBLICATIONS

International Search Report and Written Opinion issued in related PCT Application No. PCT/US2015/042066 dated Mar. 29, 2016, 12 pages.

Hettiarachchi, Kanaka, and Abraham P. Lee. "Polymer—lipid microbubbles for biosensing and the formation of porous structures." Journal of colloid and interface science 344.2 (2010): 521-527.

Sirsi, S. R., and M. A. Borden. "Microbubble compositions, properties and biomedical applications." Bubble Science, Engineering & Technology 1.1-2 (2009): 3-17.

van der Graaf, Schroen, C. G. P. H. Schroen, and R. M. Boom. "Preparation of double emulsions by membrane emulsification—a review." Journal of Membrane Science 251.1 (2005): 7-15. should this also be cited? cited in 7838.

International Search Report and Written Opinion issued in related PCT Application No. PCT/US2015/042042 dated Oct. 27, 2015, 12 pages.

* cited by examiner

MICROBUBBLES FOR TREATMENT CHEMICAL DELIVERY IN SUBTERRANEAN FORMATIONS

CROSS-REFERENCE TO RELATED APPLICATION

The present application is a U.S. National Stage Application of International Application No. PCT/US2015/042066 filed Jul. 24, 2015, which is incorporated herein by reference in its entirety for all purposes.

BACKGROUND

The present disclosure relates to compositions, systems, and methods for treating subterranean formations.

Certain low permeability or "tight" formations, such as shale, tight gas, clay, and coal bed formations, hydraulic fracturing stimulation is often used to more effectively produce fluids such as oil and gas from the formation. A hydraulic fracturing stimulation in shale or other similar formation not only forms primary fractures in the near field around the well bore, but also forms induced, dendritic fractures (sometimes referred to as "microfractures") in the far field regions extending from the primary fractures. These induced, dendritic fractures are generally formed at the tip and edges of the primary fractures, and extend outwardly in a branching tree like manner from the primary fractures. Because these secondary, dendritic fractures can extend transversely to the trajectory of the primary fractures, they reach and link natural fractures both in and adjacent to the trajectory of the primary fractures. As such, they reach a larger portion of the naturally occurring fracture network, and link the natural fractures back to the primary fractures and to the well. Shale, coal and many other low permeability formations, for example, formations having a permeability of approximately 1 millidarcy (mD) or less, are known to fracture in this manner.

In certain treatments, small sized proppants such as micro proppants have been described and/or used to prop open these microfractures in tight formations, among other reasons, to facilitate the flow of fluids through those microfractures and improve the recovery of those fluids from the formation. However, the treatment of portions of subterranean formations comprising microfractures in a manner that does not plug off microfractures or cause screen-outs can prove challenging.

BRIEF DESCRIPTION OF THE DRAWINGS

These drawings illustrate certain aspects of some of the embodiments of the present disclosure, and should not be used to limit or define the claims.

Figure 1:
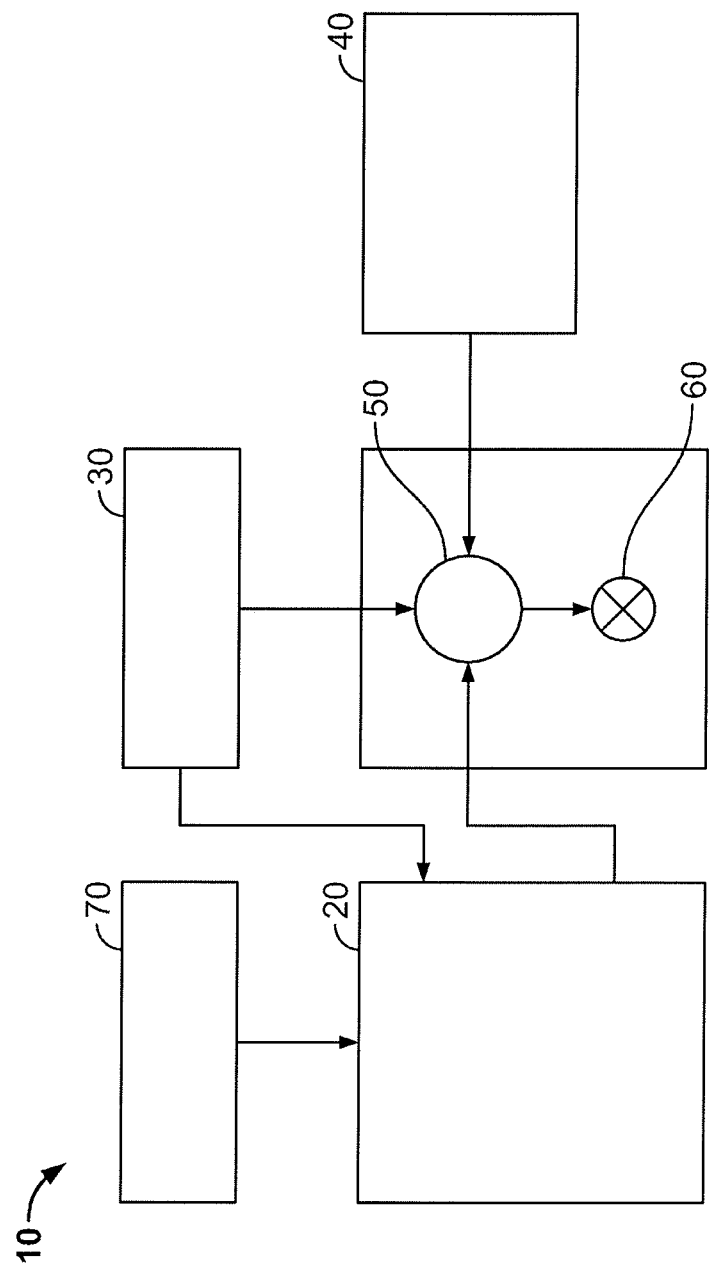
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions, systems, and methods for treating subterranean formations. More particularly, the present disclosure relates to compositions, systems, and methods for delivering treatment chemicals, for example, to enhance conductivity in microfractures and/or low-permeability formations.

The present disclosure provides methods and systems for delivering treatment chemicals into a subterranean formation using a plurality of microbubbles that are introduced (e.g., pumped) into the formation. The microbubbles of the present disclosure are generally small bubbles or capsules having an outer shell and one or more treatment chemicals within the shell, and which have a diameter of about 100 microns or less. The methods of the present disclosure generally comprise: providing a treatment fluid that comprises a base fluid and a plurality of microbubbles; and introducing the treatment fluid into at least a portion of a subterranean formation, for example, in the course of a hydraulic fracturing treatment. In certain embodiments, at least a portion of the subterranean formation may be a low-permeability formation, e.g., a formation having a permeability of approximately 1 millidarcy (mD) or less. In certain embodiments, the microbubbles may enter one or more microfractures in the formation, at which point the treatment chemical within the microbubbles may be released into the microfractures. The treatment chemical may react with one or more components within the microfracture to provide one or more treatments therein, including but not limited to etching of the microfracture face. The present disclosure also provides systems for preparing the treatment fluids of the present disclosure comprising the microbubbles and introducing them into a subterranean formation.

Among the many potential advantages to the methods and compositions of the present disclosure, only some of which are alluded to herein, the methods, compositions, and systems of the present disclosure may facilitate more effective treatment of regions of a formation that comprise microfractures. In certain embodiments, the methods, compositions, and systems of the present disclosure may help increase conductivity of microfractures in tight formations (either with or substantially without the use of micro proppant). In certain embodiments of the present disclosure, the use of microbubbles for delivery of treatment chemicals may, among other benefits: (1) control and/or delay the action of the treatment chemical until it can reach microfractures or other far wellbore regions in the formation, (2) prevent premature spending of treatment chemicals in the near wellbore regions, (3) reduce acid corrosion or other exposure-related damage to surface equipment or other equipment uphole of the region to be treated, and/or (4) facilitate safer and/or easier handling of certain treatment chemicals.

The microbubbles of the present disclosure generally comprise small bubbles or capsules having an outer shell and one or more treatment chemicals within the shell, and which have a diameter of about 100 microns or less. As used herein, the term "diameter" refers to a straight line segment joining two points on the outer surface of the microbubble and passing through the central region of the microbubble, but does not imply or require that the microbubble is spherical in shape or that it have only one diameter. In certain embodiments, the microbubbles may have diameters in a range of from about 0.1 microns to about 100 microns. In certain embodiments, the microbubbles may have diameters in a range of from about 0.1 microns to about 50 microns. In certain embodiments, the microbubbles may be smaller than 100 mesh (149 microns), and in certain instances equal to or smaller than 200 mesh (74 microns), 230 mesh (63 microns) or even 325 mesh (44 microns). The size and/or diameter of the microbubbles may be tailored for a particular application based on, for example, the estimated width of one or more microfractures in a subterranean formation in which the microbubbles are to be used, as well as other factors. The microbubbles may be of any shape (regular or irregular) suitable or desired for a particular application. In some embodiments, the microbubbles may be round or spherical in shape, although they may also take on other shapes such as ovals, capsules, rods, toroids, cylinders, cubes, or variations thereof. In certain embodiments, the microbubbles of the present disclosure may be relatively flexible or deformable, which may allow them to enter certain perforations, microfractures, or other spaces within a subterranean formation whereas solid particulates of a similar diameter or size may be unable to do so.

In the uses of the microbubbles of the present disclosure, the treatment chemical may be released from within the outer shell by any means. For example, in some embodiments, the treatment chemical may diffuse through the shell, for example, when heat or pressure (e.g., closure pressure of a microfracture) is applied to the microbubbles in the subterranean formation. In other embodiments, the outer shell may be broken, dissolved, degraded, or ruptured, for example, by pressure, shear stress, pH changes, or other conditions that the microbubble may experience in the subterranean formation, allowing the treatment chemical to flow out of an opening in the shell.

The microbubbles of the present disclosure may be provided or formed using any suitable means, including but not limited to emulsion polymerization (e.g., using conventional or invert emulsions). In these embodiments, the treatment chemical may be provided in the internal phase of the emulsion, causing it to be placed in the interior of the microbubbles formed. Once formed, the bubbles may be size-isolated from the polymerization product, for example, by filtration, centrifugation, or solvent evaporation. In other embodiments, the microbubbles may be formed by taking a preformed hollow microbubble and placing the treatment chemical in the hollow space within it, for example, by diffusing the treatment chemical through the shell (e.g., by application of heat or pressure to the microbubble when placed in a solution of the treatment chemical). In other embodiments, particles of the treatment chemical or materials carrying it may be coated with a material that forms a shell around it. In other embodiments, the microbubble may be formed via a "self-encapsulation" process in which a quantity of the treatment chemical may be provided in a mixture with reactants that can react to form the outer shell. The reactants may diffuse to the outer surface of the mixture (e.g., due to osmotic pressure or pressure applied to the substance) where they may react and form the outer shell around the treatment chemical. In some embodiments, the appropriate amount of reactants may be included and/or the appropriate amount of pressure may be created such that the reactants will stop diffusing to the outer surface once an outer shell of an appropriate thickness is formed. In some embodiments, the outer shell may be further functionalized for one or more purposes.

Figure 3:
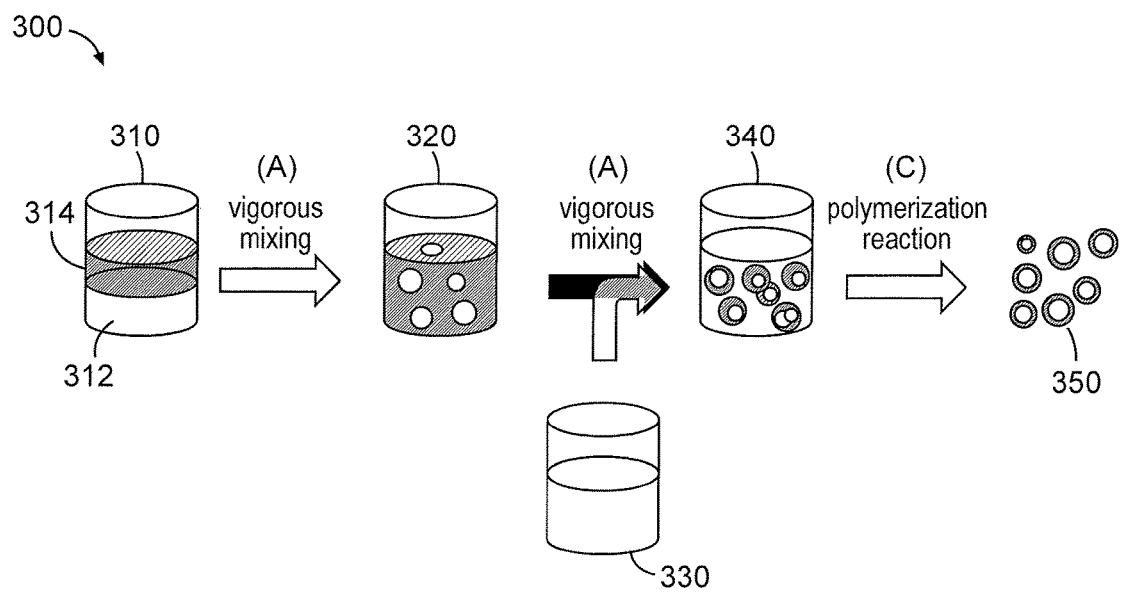
FIG. 3 is a diagram illustrating an example of a process for forming microbubbles according to certain embodiments of the present disclosure.

An example of a double-emulsion polymerization process 300 that may be used to form certain microbubbles of the present disclosure is illustrated in FIG. 3. Referring now to FIG. 3, process 300 begins by forming a mixture 310 of an aqueous liquid 312 in which a treatment chemical (e.g., acid, electrolyte, chelating agent, etc.) is suspended or dissolved, and an organic liquid 314. In certain embodiments, the aqueous liquid 312 may comprise a 20% by weight aqueous solution of hydrochloric acid. In certain embodiments, the organic liquid 314 may comprise a mixture or solution of compounds that are capable of reacting to polymerize. For example, the organic liquid 314 may comprise one or more monomers (e.g., methyl methacrylate), a crosslinker (e.g., ethylene glycol dimethacrylate), a hydrophobic/lipophilic surfactant (e.g., sorbitan trioleate), and a radical initiator (e.g., azobisisobutyronitrile (AIBN)). Various organic solvents may be used in the organic liquid 314, and would be recognized by a person of ordinary skill in the art with the benefit of this disclosure. At step A, the liquids 312 and 314 are subjected to sufficient mixing to form a primary water-in-oil emulsion 320. In step B, emulsion 320 is combined with a second aqueous liquid 330, which may comprise an aqueous solution of a hydrophobic stabilizer (e.g., 2.5% polyvinyl alcohol in water), a hydrophilic surfactant (e.g., sodium dodecyl sulfate), and a salt (e.g., sodium chloride) to control osmotic pressure. The emulsion 320 and aqueous liquid 330 are subjected to sufficient mixing to form a water-in-oil-in-water emulsion 340, wherein the aqueous liquid 330 is the external phase for the emulsion. At step C, a polymerization reaction may be initiated (e.g., by activating a radical initiator in the organic phase), causing the monomers in the organic phase to polymerize and the formation of microbubbles of the present disclosure 350. The microbubbles 350 each may comprise an internal aqueous core that comprises a portion of the aqueous liquid 312 and the treatment chemical therein, surrounded by an outer polymer shell formed in the polymerization of components in the organic liquid (i.e., the oil phase of the emulsion).

In certain embodiments, the water-in-oil-in-water emulsion 340 in process 300 may instead be formed by combining two different primary water-in-oil emulsions (not shown), the aqueous phases of which may comprise solutions of different treatment chemicals. Upon polymerization of such a mixed water-in-oil-in-water emulsion, the microbubbles formed may comprise a mixture of microbubbles that comprise two or more different treatment chemicals in close proximity. The mixture of microbubbles carrying different treatment chemicals may be introduced into a subterranean formation together in a subsequent treatment, and the treatment chemicals may react together when released from their respective microbubbles. In certain embodiments, smaller solid capsules or particles (which may comprise additional treatment chemicals or other compounds) may be dispersed in the aqueous and/or organic liquids used to form the emulsions as described above, and may remain in the aqueous core or polymer shell following polymerization, as described in further detail below. In certain embodiments, such dispersed capsules or particles may comprise chemicals or additives coated with one or more substances (e.g., waxes, polymeric films such as cellulose acetate butyrate or poly(methyl methacrylate, etc.), among other reasons, to prevent premature reaction of treatment chemicals or additives contained therein.

Figure 4A:
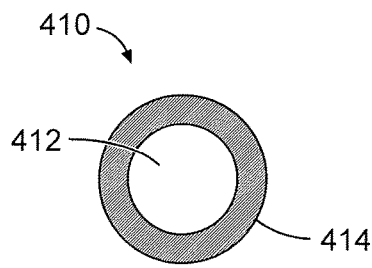
FIGS. 4A, 4B, and 4C are diagrams illustrating examples of microbubbles according to certain embodiments of the present disclosure.
Figure 4B:
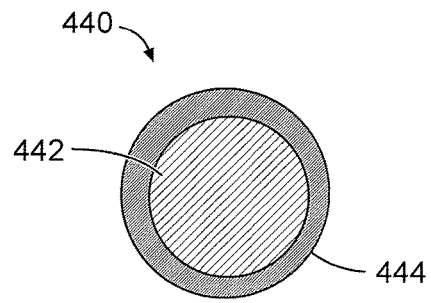
Figure 4C:
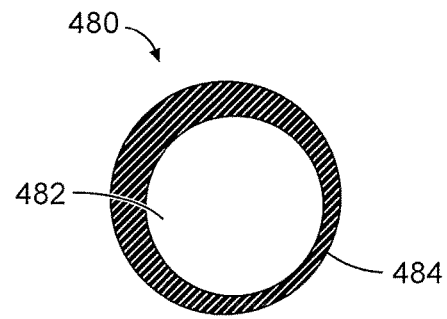

Examples of the structural form and composition of certain microbubbles of the present disclosure are illustrated in FIGS. 4A, 4B, and 4C. Referring now to FIG. 4A, similar to microbubbles 350 prepared according to process 300 in FIG. 3, microbubble 410 has an internal aqueous core 412 that comprises an aqueous solution of one or more treatment chemicals, surrounded by an outer polymer shell 414. When the microbubbles are prepared according to a polymerization process like that shown in FIG. 3, the overall dimensions of the microbubble as well as those of the core and shell may be varied by varying the compositions and proportions of the aqueous and oil phases of the emulsions as well as the speed and duration of mixing used to prepare them.

Referring now to FIG. 4B, another example of a microbubble 440 of the present disclosure is shown. Microbubble 440 also comprises an internal aqueous core 442 that comprises an aqueous solution of one or more treatment chemicals, surrounded by an outer polymer shell 444. In the embodiment shown, the aqueous core 442 further comprises a plurality of smaller capsules or particles dispersed therein, which may comprise additional treatment chemicals, surfactants, or other additives used for one or more purposes. FIG. 4C shows another example of a microbubble 480 of the present disclosure, which also comprises an internal aqueous core 482 that comprises an aqueous solution of one or more treatment chemicals, surrounded by an outer polymer shell 484. In the embodiment shown, the polymer shell 484 further comprises smaller particles or capsules dispersed therein, which may comprise additional treatment chemicals, surfactants, or other additives. In certain embodiments, the dispersed particles in the polymer shell 484 or the aqueous core 444 may simply enhance the physical strength or other mechanical properties of the microbubbles in which they are present.

It is also noted that while the embodiments of microbubbles illustrated in FIGS. 4A, 4B, and 4C and the process 300 illustrated in FIG. 3 may represent relatively simple embodiments of the present disclosure, the present disclosure also contemplates additional steps, reactions, layers, components, and/or structures that may be added to the microbubbles and/or processes described herein. For example, in some embodiments, sponge-like compositions may be formed in the cores and/or shells of the microbubbles described above by decreasing the water volume and surfactant concentration of the aqueous liquid 330 in process 300 illustrated in FIG. 3 or other similar processes. In those embodiments, care may be advisable to ensure that the transient micelle stability is maintained prior to the final polymerization reaction.

The outer shell of the microbubbles of the present disclosure may comprise any suitable material for forming that structure. In certain embodiments, the outer shell material may be substantially insoluble in water, among other reasons, to prevent the treatment chemical from contacting and prematurely reacting with an aqueous carrier fluid that may be used to carry the microbubbles into one or more microfractures downhole. Examples of materials that may be suitable for the outer shell in certain embodiments include, but are not limited to, glass, ceramic materials, polymeric materials (e.g., polyvinylidene), elastomers, urethanes, epoxies, silicones, styrenes, acrylics, lipids, proteins, any copolymer of any of the listed monomers, and the like. In certain embodiments, the outer shell may comprise multiple layers of materials surrounding the treatment chemical.

The treatment chemicals contained within the outer shell of the microbubbles of the present disclosure may comprise any compound or substance (or combination thereof) known in the art or used to perform treatments in a subterranean formation. The treatment chemical may be provided in any suitable form, including solid, liquid (e.g., slurries, solutions, etc.), hydrogel, gas, etc. In certain embodiments, portions of the treatment chemical may be embedded in a swollen polymer hydrogel that is contained within the outer shell of a microbubble.

In certain embodiments, the treatment chemical may comprise one or more acids or precursors thereof. When introduced into a microfracture in a subterranean formation, these acids may react with one or more acid-sensitive components in the microfracture, which may dissolve or otherwise help remove those components and/or at least partially "etch" the fracture face in those microfractures, thus increasing conductivity and/or stimulating fluid flow therethrough. Examples of acids that may be used in certain embodiments of the present disclosure include, but are not limited to, hydrochloric acid, hydrofluoric acid, acetic acid, formic acid, sulfuric acid, phosphoric acid, nitric acid, sulfamic acids, citric acid, glycolic acid, maleic acid, fumeric acid, other organic acids, salts thereof, and/or any combination thereof. In certain embodiments, the treatment chemical may comprise one or more acid precursors that react to form acids. For example, such precursors may include compounds that hydrolyze to form an acid. Examples of such materials include, but are not limited to esters, acid chlorides, orthoesters, formates, lactides, lactic acid derivatives, carbonates, amino acids, glycolides, ε-caprolactones, hydroxy ester ethers, hydroxybutyrates, anhydrides, phosphazenes, methyl lactate, ethyl lactate, propyl lactate, butyl lactate, formate esters (e.g., ethylene glycol monoformate, ethylene glycol diformate, diethylene glycol diformate, glyceryl monoformate, glyceryl diformate, glyceryl triformate, triethylene glycol diformate and formate esters of pentaerythritol), esters or polyesters of glycerol (e.g., tripropionin (a triester of propionic acid and glycerol), trilactin, etc.) esters of acetic acid and glycerol (e.g., monoacetin, diacetin, and triacetin), aliphatic polyesters, poly(lactides), poly(glycolides), poly(ε-caprolactones), poly(hydroxy ester ethers), poly(hydroxybutyrates), poly(anhydrides), aliphatic polycarbonates, poly(orthoesters), poly(amino acids), poly(ethylene oxides), polyphosphazenes, copolymers thereof, and/or any combination thereof. In some embodiments, the acid precursors may comprise two or more different chemicals or compounds that react to form an acid, such as a sulfonate ester and a fluoride or chloride salt. In these embodiments, the two or more different precursor chemicals may be provided in separate microbubbles, and thus only able to react with each other to form an acid once the microbubbles release them in the microfracture.

Certain chelating agents (e.g., those having sufficiently high pH in solution) also may be reactive with certain types of formations such as carbonates, and thus may be used, among other purposes, to dissolve or remove damage and/or etch or stimulate in microfractures in such formations. Examples of suitable chelating agents include, but are not limited to, ethylenediaminetetraacetic acid (EDTA), hydroxyethyl ethylenediamine triacetic acid (HEDTA), nitrilotriacetic acid (NTA), diethylene triamine pentaacetic acid (DTPA), glutamic acid diacetic (GLDA), propylene diamine tetraacetic acid (PDTA), ethylenediaminedisuccinic acid (EDDS), diethanolglycine (DEG), ethanoldiglycine (EDG), glucoheptonate, citric acid, phosphates, amines, citrates, and salts thereof. Other suitable chelating agents may include chelating agents classified as polyphosphates, aminocarboxylic acids, aminopolycarboxylates, 1,3-diketones, hydroxycarboxylic acids, polyamines, aminoalcohols, aromatic heterocyclic bases, phenols, aminophenols, oximes, Schiff bases, tetrapyrroles, sulfur compounds, synthetic macrocyclic compounds, polymers, phosphonic acids, and mixtures and derivatives thereof. Other suitable chelating agents may include N-(phosphonomethyl)iminodiacetic acid, salts of N-(phosphonomethyl)iminodiacetic acid, salts of phosphonic acids, and any combination thereof.

The treatment chemicals within the microbubbles of the present disclosure may include any number of other chemicals or compounds used to perform treatments in subterranean operations. Additional examples of such treatment chemicals that may be used include, but are not limited to, salts, surfactants, activators, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, degradable materials, fibers (e.g., degradable fibers), flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), precursors thereof, or any combinations thereof.

The treatment fluids used in the methods and systems of the present disclosure (e.g., the treatment fluids into which the microbubbles are incorporated) may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the fracturing fluids may comprise a mixture of one or more fluids and/or gases, including but not limited to emulsions, foams, and the like.

The microbubbles of the present disclosure may be provided for incorporation into a treatment fluid of the present disclosure in any form, including but not limited to liquid or gelled slurries, emulsions, or concentrates, which may facilitate the transport, storage, and/or handling of the microbubbles. In certain embodiments, the microbubbles and/or other components of the treatment fluid may be metered directly into a base treatment fluid to form a treatment fluid. The microbubbles may be incorporated into the treatment fluids of the present disclosure in any practicable amount, e.g., in any amount or concentration that provides for a pumpable treatment fluid that will allow the microbubbles to enter one or more microfractures. Notably, the microbubbles may be included in a treatment fluid at a concentration equal to or less than the critical bridging concentration of the microbubbles in the subterranean zone. For example, in certain embodiments, the microbubbles may be included in a treatment fluid in an amount of from about 0.01 pounds per gallon (lbm/gal) to about 1.0 lbm/gal of the treatment fluid. In certain embodiments, the microbubbles may be included in a treatment fluid in an amount of from about 0.01 lbm/gal to about 0.5 lbm/gal of the treatment fluid. In certain embodiments, the microbubbles may be included in a treatment fluid in an amount of about 0.1 lbm/gal of the treatment fluid.

In certain embodiments, the microbubbles of the present disclosure optionally may be at least partially coated with, and/or the treatment fluids of the present disclosure optionally may comprise, a tackifying agent. Such tackifying agents may be used, among other purposes, to enhance adhesion of microbubbles to surfaces within microfracture. This may prevent settling of the microbubbles and/or improve distribution of the microbubbles throughout a microfracture, allowing for more even treatment of the microfracture. Tackifying agents suitable for use in accordance with the present disclosure may comprise any compound that, when in liquid form or in a solvent solution, will form a tacky, non-hardening coating upon a particulate. Tackifying agents suitable for use in the present disclosure include non-aqueous tackifying agents; aqueous tackifying agents; silyl-modified polyamides, and the like. For example, aqueous tackifying agents may be used when the microbubbles of the present disclosure are incorporated into an aqueous-based treatment fluid. When included in a treatment fluid of the present disclosure, the tackifying agent may be present in a concentration that is less than that used in uses of these tackifying agents, for example, for consolidation of loose particulates in a formation. For example, in certain embodiments, the tackifying agent may be present in a treatment fluid of the present disclosure in a concentration of from about 0.01% v/v to about 0.5% v/v. In certain embodiments, such tackifying agents used with the microbubbles of the present disclosure may have a relatively low viscosity (e.g., less than about 20 cP).

Aqueous tackifying agents that may be suitable for use in the present disclosure may not be significantly tacky when placed onto a microbubble, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a microbubble to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a microbubble, will increase the continuous critical resuspension velocity of the particulate when contacted by a stream of water. The aqueous tackifying agent may enhance the grain-to-grain contact between the individual microbubbles within the formation and/or contact between the microbubbles and the fracture face. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly (butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and any combination thereof. In certain embodiments, the tackifying agent may be prepared by condensing a blend of fatty acids with a polyamine to form a polyamide.

In certain embodiments, the treatment fluids into which the microbubbles are incorporated optionally may comprise any number of additional additives. Examples of such additional additives include, but are not limited to, salts, surfactants, acids, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, degradable materials (e.g., lactides, orthoesters, and the like), fibers (e.g., degradable fibers), flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives may be added to the treatment fluid and/or activated after a viscosifying agent has been at least partially hydrated in the fluid. A person skilled in the art, with the benefit of this disclosure, will recognize the types of additives that may be included in the fluids of the present disclosure for a particular application. For example, the treatment fluids of the present disclosure optionally may comprise a friction reducing agent (e.g., a polymeric gelling agent acting as a friction reducer).

In certain embodiments of the present disclosure, micro proppant optionally may be used and/or introduced into certain regions of a subterranean formation in conjunction with the microbubbles of the present disclosure. In certain embodiments, such micro proppant may be smaller than 100 mesh (149 microns), and in certain instances equal to or smaller than 200 mesh (74 microns), 230 mesh (63 microns) or even 325 mesh (44 microns). In certain embodiments, such micro proppant particulates may have diameters of about 100 microns or less. When used, the micro proppant may comprise any suitable particulate material of the appropriate size, including but not limited to carbonates, alumina, organic silicates, silica, sulfates (e.g., barium sulfate), resins, glass, ceramic materials, polymeric materials, filler materials, fibrous materials, degradable materials, and the like. In certain embodiments, the micro proppant may be coated and/or used with one or more resins or tackifying agents, among other reasons, to assist the micro proppants in forming clusters, aggregates, and/or "pillars" of micro proppant in the microfracture(s) in the formation. In certain embodiments, such resins or tackifying agents used with the micro proppants and/or microbubbles of the present disclosure may have a relatively low viscosity (e.g., less than about 20 cP).

In certain embodiments, the optional micro proppant may be introduced into the subterranean formation and/or microfractures at substantially the same time or in the same fluid that the microbubbles are introduced into the formation and/or microfractures. In other embodiments, the optional micro proppant may be introduced subsequently using a separate fluid. In certain embodiments, the optional micro proppant may be pre-formed and mixed into one or more treatment fluids that are introduced into a subterranean formation. In other embodiments, the optional micro proppant may be generated downhole, for example, by introducing into the formation reactants or precursors (in the same treatment fluid or in different treatment fluids) that will react to form micro proppant. For example, calcium carbonate proppant may be generated by providing calcium oxide and carbon dioxide in the formation, which react to form calcium carbonate. In certain embodiments, such precursors or reactants may be provided for introduction into the formation as the treatment chemicals in microbubbles of the present disclosure. Notably, the micro proppant may be introduced and/or generated in the subterranean zone at a concentration equal to or less than the critical bridging concentration of the micro proppant in the subterranean zone. For example, in certain embodiments, the optional micro proppant may be included in a treatment fluid in an amount of from about 0.01 pounds per gallon (lbm/gal) to about 0.4 lbm/gal of the treatment fluid. In certain embodiments, the optional micro proppant may be included in a treatment fluid in an amount of about 0.1 lbm/gal of the treatment fluid. In certain instances, additional treatment stages can provide proppant of larger sizes than micro proppant to prop the primary fractures. The stages can be arranged to provide the proppant and micro proppant intermixed and/or some stages can provide substantially just micro proppant and other stages can provide just larger proppant. These additional proppant may comprise any proppant materials known in the art, including but not limited to fibrous materials.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the base fluid may be mixed with the microbubbles and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, gravel-packing treatments, frac-packing treatments, and acidizing treatments, certain drilling operations, and the like. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid (e.g., sometimes called a "pad fluid") may be introduced at a pressure sufficient to create or enhance one or more fractures (e.g., primary fractures, cracks, microfractures, and/or microcracks) within the subterranean formation (e.g., hydraulic fracturing).

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a treatment fluid producing apparatus 20, a fluid source 30, a microbubble source 40, and a pump and blender system 50 and resides at the surface at a well site where a well 60 is located. In certain embodiments, the treatment fluid producing apparatus 20 may combine a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the treatment fluid producing apparatus 20 can be omitted and the treatment fluid sourced directly from the fluid source 30. In certain instances, the treatment fluid may comprise water, a hydrocarbon fluid, a polymer gel, foam, air, wet gases and/or other fluids.

The microbubble source 40 can include or contain a liquid slurry, emulsion, or concentrate of microbubbles of the present disclosure for combination with the treatment fluid. The slurry, emulsion, or concentrate of microbubbles may be prepared by any suitable means, either at the site or at an offsite location. The system may also include additive source 70 that provides one or more additives (e.g., gelling agents, weighting agents, and/or other optional additives) to alter the properties of the treatment fluid. For example, the other additives 70 can be included to reduce pumping friction, to reduce or eliminate the fluid's reaction to the geological formation in which the well is formed, to operate as surfactants, and/or to serve other functions. In some embodiments, the pump and blender system may further comprise one or more proppant sources and/or microproppant sources (not shown) to incorporate proppant and/or microproppant into fluids introduced into the subterranean formation.

The pump and blender system 50 receives the treatment fluid and combines it with other components, including microbubbles from the microbubble source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the treatment fluid producing apparatus 20, fluid source 30, and/or microbubble source 40 may be equipped with one or more metering devices (not shown) to control the flow of fluids, microbubbles, and/or other compositions to the pumping and blender system 50. Such metering devices may permit the pumping and blender system 50 can source from one, some or all of the different sources at a given time, and may facilitate the preparation of treatment fluids in accordance with the present disclosure using continuous mixing or "on-the-fly" methods. Thus, for example, the pumping and blender system 50 can provide just base fluid into the well at some times, just microbubbles at other times, and combinations of those components at yet other times.

Figure 2:
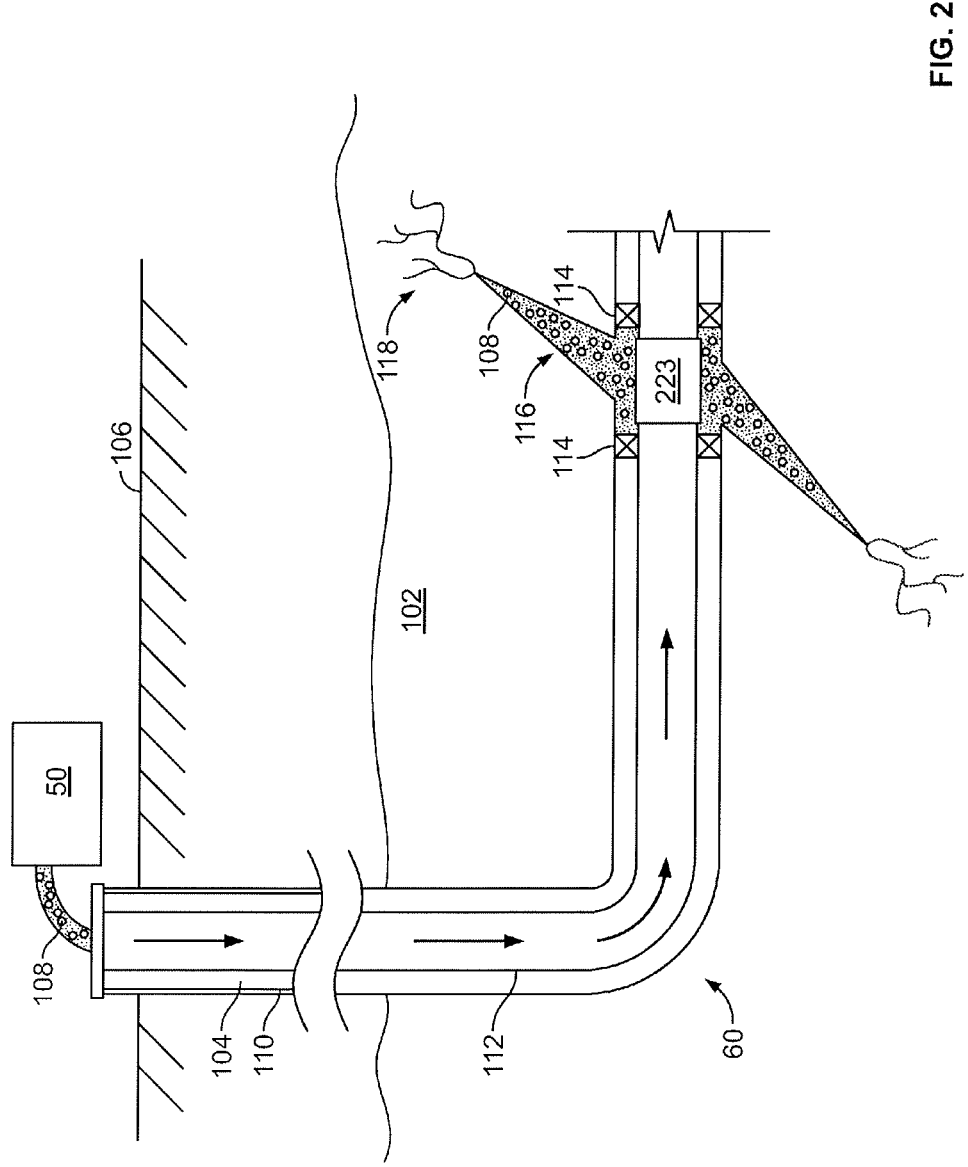
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the treatment fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the treatment fluid 108 into the well bore 104. The working string 112 may include coiled tubing, jointed pipe, and/or other structures that allow fluid to flow into the well bore 104. The working string 112 can include flow control devices 223 (e.g., bypass valves, ports, and or other tools or well devices) that control a flow of fluid from the interior of the working string 112 into the subterranean zone 102. For example, the working string 112 may include ports adjacent the well bore wall to communicate a treatment fluid 108 (e.g., fracturing fluid, pad fluids, as well as other fluids) directly into the subterranean formation 102, and/or the working string 112 may include ports that are spaced apart from the well bore wall to communicate treatment fluid 108 and/or other fluids into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which a treatment fluid 108 or other fluids will be pumped. FIG. 2 shows two packers 114, one defining an uphole boundary of the interval and one defining the downhole end of the interval. When a fluid 108 is pumped into the desired interval of the well bore 104 at or above a certain hydraulic pressure, the rock of the subterranean zone 102 "fractures," in that one or more fractures or cracks are created in the zone or one or more existing fractures or cracks in the zone 102 are enlarged or enhanced. In the embodiments shown, the rock matrix of the subterranean zone 102 is of a type that, when fractured, produces both a primary fracture 116 in the near field and secondary fractures (e.g., induced, dendritic fractures or microfractures) 118 in the far field. The secondary fractures 118 have propagated from or near the ends and edges of the primary fracture 116. In certain instances, the subterranean zone 102 is a low permeability zone having a permeability of 1 mD or less. For example, the subterranean zone 102 can comprise a shale, tight gas, clay, and/or coal bed formation. In certain instances, the rock matrix of the subterranean zone 102 may include cleating or natural fractures (i.e., those that existed prior to, and were not caused by, a fracture treatment). The natural fractures tend to run generally in a direction that is parallel to the primary fracture 116. The secondary fractures 118 run in many directions including directions non-parallel and, in certain instances, perpendicular to the direction of the primary fracture 116. As a result, the secondary fracture 118 can cross, and thereby link, the natural fractures to the primary fracture 116.

The fracturing treatment may be performed in one or more stages, where different amounts, sizes, and/or concentrations of microbubbles, proppant (including micro proppant as well as larger proppant), or other additives are provided into the fractures 116, 118. For example, in certain instances, the fractures 116, 118 can be initiated with a pad fluid containing little or no microbubbles or micro proppant, then subsequent stages can provide the microbubbles, micro proppant, and then conventional proppant to the fractures 116, 118 in a manner that fills and props both the secondary fractures 118 and primary fractures 116 open. In other embodiments, the microbubbles of the present disclosure may be included in the initial pad fluid, followed by one or more other fluids that carry micro proppant or other proppant that may be deposited in fractures 116, 118 (e.g., micro proppant being pumped first to be deposited in the secondary fractures 118, followed by additional proppant particulates such as 100-mesh sand or 40/70 mesh sand to be deposited in the primary fracture 116). Given the small size of the dendritic, secondary fractures 118, one or more of the stages may introduce microbubbles and/or micro proppant such that the particle size is less than the transverse dimension of the fracture when held open under fracturing pressure.

Once secondary fractures 118 are created, the microbubbles in fluid 108 may flow into the open space within those fractures. Once the fluid pressure is released or reduced, the secondary fractures 118 may at least partially close on the microbubbles, which may release the treatment chemicals within those microbubbles (e.g., via rupturing of the outer shell, diffusion of the treatment chemical through the shell, etc.) into the microfractures. In certain embodiments, the treatment chemicals may comprise acids or chelating agents that may etch portions of the fracture faces in fractures 116 and/or 118, thereby increasing the conductivity of those regions.

While not specifically illustrated herein, the disclosed methods and compositions may also directly or indirectly affect any transport or delivery equipment used to convey the compositions to the fracturing system 10 such as, for example, any conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

In certain embodiments, fracturing treatments also may be performed according to the present disclosure using hydrajetting tools. In these embodiments, a hydrajetting tool having at least one fluid jet forming nozzle may be positioned in the well bore adjacent the formation to be fractured, and then fluid may be jetted through the nozzle against the formation at a pressure sufficient to form a cavity therein and form one or more fractures (e.g., primary fractures and/or secondary microfractures) in the formation by stagnation pressure in the cavity. In certain embodiments, the jetted fluid and/or a fluid subsequently introduced into the fractures may comprise one or more microbubbles of the present disclosure (and, optionally, micro proppant, tackifying agents, and/or other additives discussed above), thereby allowing the microbubbles to enter the fractures and/or microfractures in the formation. The microbubbles may release treatment chemicals in these fractures and/or microfractures in a manner similar to that described above. These types of fracturing treatments using a hydrajetting tool may be performed in open holes as well as cased well bores.

An embodiment of the present disclosure is a method comprising: providing a treatment fluid that comprises a base fluid and a plurality of microbubbles, wherein one or more of the microbubbles each comprise at least an outer shell and a treatment chemical within the shell, and have a diameter of about 100 microns or less; and introducing the treatment fluid into at least a portion of a subterranean formation.

Another embodiment of the present disclosure is a method comprising: providing a fracturing fluid that comprises an aqueous base fluid and a plurality of microbubbles, wherein one or more of the microbubbles each comprise at least an outer shell and a treatment chemical within the shell, and have a diameter of about 100 microns or less; introducing the fracturing fluid into at least a portion of a subterranean formation at or above a pressure sufficient to create at least one microfracture in the subterranean formation; allowing one or more of the microbubbles to enter at least one microfracture in the subterranean formation; and allowing the one or more microbubbles to release the treatment chemical in the microfracture.

Another embodiment of the present disclosure is a method comprising: providing a fracturing fluid that comprises an aqueous base fluid and a plurality of microbubbles, wherein one or more of the microbubbles each comprise at least an outer shell and a treatment chemical within the shell, and have a diameter of about 100 microns or less; introducing the fracturing fluid into a well bore penetrating at least a portion of a subterranean formation at or above a pressure sufficient to create or enhance at least one primary fracture in the subterranean formation and at least one microfracture in the subterranean formation extending from or near the end of the primary fracture; allowing one or more of the microbubbles to enter the microfracture in the subterranean formation; allowing the one or more microbubbles to release the treatment chemical in the microfracture; introducing a treatment fluid that comprises a plurality of proppant particulates into the well bore; and depositing at least a portion of the plurality of proppant particulates in the primary fracture in the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid that comprises a base fluid and a plurality of microbubbles, wherein the microbubbles each comprise at least an outer shell and a treatment chemical within the shell, and have a diameter of about 100 microns or less, and wherein the treatment chemical comprises one or more of an acid, an acid precursor, or a chelating agent;
introducing the treatment fluid into at least a portion of a subterranean formation comprising at least one microfracture;
allowing one or more of the microbubbles to enter the microfracture in the subterranean formation; and
depositing a plurality of micro proppant particulates in the microfracture in the subterranean formation.

2. The method of claim 1 wherein the portion of the subterranean formation has a permeability of about 1 millidarcy or less.

3. The method of claim 1 wherein treatment fluid further comprises the plurality of micro proppant particulates.

4. The method of claim 1 wherein the treatment chemical comprises one or more acid precursors, and wherein the one or more acid precursors comprise two or more different chemicals or compounds that react with each other to form an acid once released from the microbubble in the microfracture.

5. A method comprising:
providing a fracturing fluid that comprises an aqueous base fluid, and a plurality of microbubbles, wherein the microbubbles each comprise at least an outer shell and a treatment chemical within the shell, and have a diameter of about 100 microns or less, and wherein the treatment chemical comprises one or more of an acid, an acid precursor, or a chelating agent;
introducing the fracturing fluid into at least a portion of a subterranean formation at or above a pressure sufficient to create at least one microfracture in the subterranean formation;
allowing one or more of the microbubbles to enter at least one microfracture in the subterranean formation; and
allowing the one or more microbubbles to release the treatment chemical in the microfracture.

6. The method of claim 5 wherein the fracturing fluid is a pad fluid.

7. The method of claim 5 wherein the fracturing fluid is introduced into the portion of the subterranean formation using one or more pumps.

8. The method of claim 5 wherein the fracturing fluid comprises a plurality of micro proppant particulates.

9. The method of claim 8 further comprising depositing at least a portion of the plurality of micro proppant particulates in the microfracture in the subterranean formation.

10. The method of claim 5 wherein the fracturing fluid comprises a tackifying agent.

11. The method of claim 5 wherein the portion of the subterranean formation has a permeability of about 1 millidarcy or less.

12. A method comprising:
providing a fracturing fluid that comprises an aqueous base fluid, and a plurality of microbubbles, wherein the microbubbles each comprise at least an outer shell and a treatment chemical within the shell, and have a diameter of about 100 microns or less;
introducing the fracturing fluid into a well bore penetrating at least a portion of a subterranean formation at or above a pressure sufficient to create or enhance at least one primary fracture in the subterranean formation and at least one microfracture in the subterranean formation extending from or near the end of the primary fracture;
allowing one or more of the microbubbles to enter the microfracture in the subterranean formation;
allowing the one or more microbubbles to release the treatment chemical in the microfracture;
introducing a treatment fluid that comprises a plurality of proppant particulates into the well bore; and
depositing at least a portion of the plurality of proppant particulates in the primary fracture in the subterranean formation.

13. The method of claim 12 wherein the fracturing fluid comprises a tackifying agent.

14. The method of claim 12 wherein the treatment chemical is selected from the group consisting of: an acid; an acid precursor; a chelating agent; and any combination thereof.

* * * * *